Sept. 1, 1959 J. VOLK 2,902,346
PRESSURE HYDRATED LIME
Filed June 20, 1956
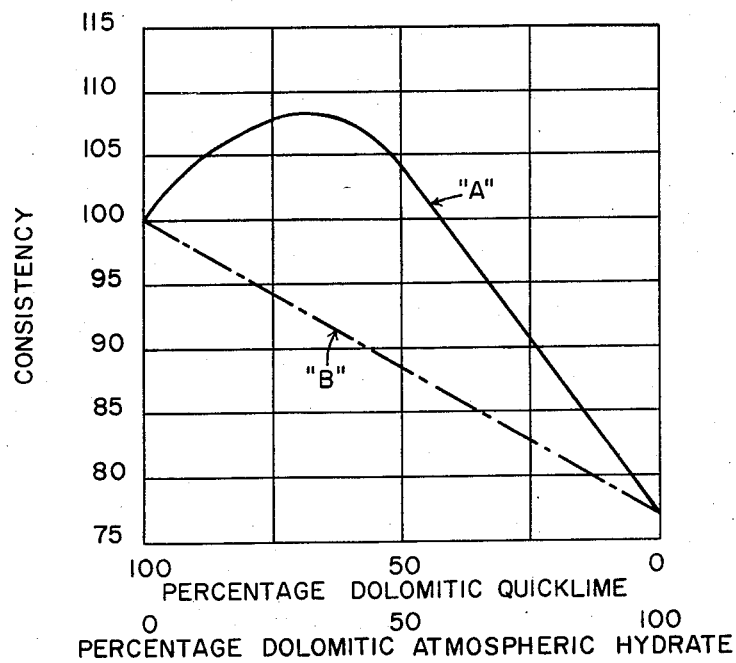
INVENTOR.
Joseph Volk
BY
ATTORNEY

United States Patent Office 2,902,346
Patented Sept. 1, 1959

2,902,346
PRESSURE HYDRATED LIME

Joseph Volk, North Tonawanda, N.Y., assignor to National Gypsum Company, Buffalo, N.Y., a corporation of Delaware Application June 20, 1956, Serial No. 592,565

6 Claims. (Cl. 23—188)

The present invention is directed to an improved pressure-hydrated lime and to its method of manufacture. This invention relates particularly to the method of pressure-hydrating dolomitic lime.

The use of superatmospheric pressures in the hydration of dolomitic quicklimes, to effect the hydration of the magnesium oxide, as well as the calcium oxide, to their respective hydroxides, is well known. One or the other of two methods is commonly used in the pressure-hydration process. In the single step method, dolomitic quicklime, with the proper ratio of water, is charged into a pressure hydrator, and subjected to a superatmospheric pressure throughout hydration. In the two-step method, dolomitic quicklime and a proper ratio of water are first reacted in means open to the atmosphere, producing what is known in the industry as normal-hydrate or atomspheric-hydrate, a mixture of calcium hydroxide and magnesium oxide. The second step then consists of charging the atmospheric hydrate, with a further proper ratio of water, into a pressure hydrator and subjecting the atmospheric hydrate and water to superatmospheric pressures during this further hydration, which, in general, converts the magnesium oxide to its hydroxide.

The pressure-hydrated lime, in either case, is then processed as by milling for the purpose of altering and attaining improved product characteristics, the subsequent processing operation being unrelated basically to the present invention.

Each of the three above mentioned hydration reactions, the one in the one-step method and the two in the two-step method, is an exothermic reaction. The quicklime and water first reaction of the two-step method produces a far more exothermic reaction than the second step, pressurized, atmospheric-hydrate and water reaction. The single step mixture of quicklime and water under superatmospheric conditions produces an even greater exothermic reaction, such as can be termed violent, and which, on a commercial scale, is recognized as hazardous. And it is principally due to the hazardous nature of the one-step hydration that some manufacturers of pressure-hydrate now resort to the two-step hydration.

The use of the two-step hydration, in comparison to the one-step hydration, results in a lower consistency product. A method of producing the substantially fully hydrated pressure-hydrate, free of the hazards of the one-step method, providing a product of the higher consistencies as produced by the one-step method is desired. Furthermore, improvement of soaking qualities and hoddability of pressure-hydrated finishing limes have been long sought after in the industry.

It is a principal object of the present invention to provide a method for making pressure-hydrate which does not involve the hazards of the above described one-step method but which produces a pressure-hydrate having consistencies equal to or higher than that product produced by the one-step method. Briefly, this method contemplates the superatmospheric pressure hydration of a mixture of dolomitic quicklime, atmospherically-hydrated lime and water.

It is a further object of the invention to provide a method for making a pressure-hydrate which, upon subsequent processing to increase plasticity, has improved soaking and hoddability characteristics.

It is a still further object of the present invention to provide an improved pressure-hydrate, having high consistency and improved soaking and hoddability characteristics.

The calcination of dolomitic limestone, converting the rock into dolomitic quicklime, a mixture of calcium oxide and magnesium oxide, is well known. The calcination is carried out in a continuous process, ordinarily in either a shaft or rotary kiln, maintained at high temperatures. Any other method of calcining to a suitable quicklime, could, however, be employed without departure from the present invention.

In accordance with the invention, the dolomitic quicklime produced in the above calcination is divided subsequent to discharge from the kiln, and reduction to approximately minus $\frac{3}{8}$ inch particle size. A first portion of the quicklime is hydrated at atmospheric pressures. The atmospheric hydration may be carried out in commercial hydrating equipment such as the Clyde or the Schaffer hydrators. The hydration of the first portion is conducted in a manner similar to the atmospheric hydration of all of the quicklime in the first step of the prior two-step method, discussed above. Sufficient water is used in the atmospheric hydration of the first portion to convert substantially all, if not all, of the calcium oxide to calcium hydroxide. It is further preferred, also, that no more than sufficient water for this reaction be used, so that a resultant dry atmospheric-hydrate is produced.

The atmospheric-hydrate, produced from the first portion of quicklime, is then mixed with a second portion of dolomitic quicklime, preferably in approximately a 1 to 1 weight ratio. The mixture is charged into an autoclave with sufficient water for a pressure hydration of the mixture to a resultant dry product of fully hydrated calcium and magnesium hydroxides. The exothermic nature of this reaction is sufficient to form steam and, thus, provide the superatmospheric pressure for the pressure hydration. Alternatively, external steam may be used to accelerate the process. In either case, operating pressures will ordinarily be used within the range of 150 to 300 p.s.i., with the equivalent temperatures for saturated steam vapor. A hydration pressure of 80 p.s.i. has been found to be approximately the minimum for converting all of the MgO to the hydroxide in any practical or reasonable period of time. The time required for the pressure hydration of the mixture will, at 150 to 300 p.s.i. and with average commercial equipment, be of the order of 10 to 15 minutes for a complete cycle. These temperature, pressure, and time conditions are generally in accordance with other prior pressure-hydration processes.

With the above preferred ratio of mixture of quicklime and atmospheric-hydrate in the autoclave, the exothermic reaction on hydration has been found to start sufficiently gradual so that, even with the autoclave charged relatively full, as required for economy, autoclave pressures can be manually controlled, without sole reliance on safety valves. In comparison, the prior one-step pressure hydration of 100% quicklime starts with an instantaneous violent exothermic reaction, whereby, with any reasonably full charge in the autoclave, pressures increase far too rapidly for reliance on manual control, creating an obviously hazardous operation.

The mixture-hydrate, made in accordance with the preferred form of the invention, has been found to have as high a consistency as the prior product of the one-step pressure hydration, if not somewhat higher. Consistency of a hydrate is that weight of water in grams necessary to add to 100 grams of hydrate to produce a putty having a Vicat of 20. A putty having a Vicat of 20 is one which is penetrated to a depth of 20 mm.±5 mm., by a 30 gram plunger, of 12½ cm. diameter, resting thereon for 30 seconds.

Pressure-hydrates produced by the prior two-step method are of a consistency of the order of 75 to 80. Pressure-hydrates produced by the prior one-step method are of a consistency of the order of 95 to 105, averaging 100. Based on an analysis of approximately fifty samples of pressure-hydrate, produced by pressure hydration of approximately 50–50 mixtures of dolomitic quicklime and atmospheric-hydrate, consistencies varied from 95 to 109, with a consistency for a 50–50 pressure-hydrate averaging in the order of 104, a substantially higher consistency than that of the products of the prior one-step method. This consistency data was the result of laboratory test under constant test conditions.

It has further been found that with any of the known methods of processing pressure-hydrate for providing the desired higher plasticity, high plasticities may be obtained with the novel hydrate equivalent to the plasticities obtained with hydrates pressure-hydrated by the prior one- or two-step methods. For example, pressure-hydrate of the present invention may be ball-milled for approximately ten to twenty minutes, in accordance with prior practice, to increase the plasticity.

With regard to the ratio of the mixture of quicklime and atmospheric-hydrate, it has been discussed above that a preferred ratio is the mixture of a given amount of quicklime with substantially an equal amount of atmospheric-hydrate. Considering the variations in dolomitic quicklime, caused by variations in limestone, 50 pounds of dolomitic quicklime will produce, on atmospheric hydration, from about 58 to about 60 pounds of atmospheric-hydrate. Thus, the preferred process of the invention, referred to as using a 50–50 mixture may be expressed, also, as the superatmospheric hydration of a mixture of 50 parts of dolomitic quicklime and an amount of atmospherically-hydrated dolomitic lime that would be produced by atmospheric hydration of about 42 parts of dolomitic quicklime.

The pressure hydration of a mixture of 67 parts quicklime and 33 parts of atmospheric-hydrate, as compared to that of the 50–50 mixture, will be seen to more closely approximate the process of the prior one-step method. However, the product of a pressure-hydration of the 67–33 mixture, to a dry pressure-hydrate, when milled has been found to have an average consistency in the order of 108, which is higher than that of either the milled one-step pressure-hydrate or the milled 50–50 mixture pressure-hydrate.

An increase in the proportion of atmospheric-hydrate to quicklime, in excess of that of the 50–50 mixture, has been found to produce a pressure-hydrate, when milled, of proportionally lower consistency, tending toward the consistencies of pressure-hydrate produced by the prior two-step method. A 33–67 mixture of quicklime and atmospheric-hydrate, when pressure-hydrated and milled, provides a pressure-hydrate of approximately 95 consistency. The pressure-hydration and milling of such mixtures still results in pressure-hydrate consistencies above that which would be expected from any analysis of the prior one and two-step methods, as will be seen by analysis of the drawing.

Referring to the drawing, a graphical analysis is presented by curve A of the relation between the percentage of atmospheric-hydrate, or reversely, the percentage of quicklime, in the mixture of quicklime and atmospheric-hydrate subjected to pressure-hydration, vs. the consistencies of the milled products of such pressure-hydration. It will be recognized that a 0% atmospheric-hydrate "mixture" would be composed of 100% quicklime and the hydration of such would be the prior one-step pressure-hydration process. Conversely, the pressure-hydration of a 100% atmospheric-hydrate "mixture" would be the prior two-step method. Thus, a straight line B, which is plotted between the 100% atmospheric-hydrate and the 100% quicklime "mixtures," defines the calculated or expected consistency for a product of the novel process. It will be seen that pressure-hydration of any mixture of quicklime and atmospheric-hydrate, when milled, provides a product having consistencies far above what could be expected, if such theoretical analysis were to have been made.

The novel process will be seen to provide an improved means for producing a pressure-hydrate, with far safer reaction conditions of the nature previously provided by two-step pressure-hydration, which novel pressure-hydrate has been found to have properties unexpectedly approximating or surpassing those previously obtained by one-step pressure-hydration.

The pressure-hydration of mixtures of no less than about 33% atmospheric-hydrate, with the balance of the mixture being quicklime, will be seen to provide a complete and unexpectedly wide range of pressure-hydrate consistencies.

A particular advantage of the invention is obtained with between 33% and 67% quicklime and between 33% and 67% atmospheric-hydrate mixed for pressure-hydration, in that, within these general limits, consistency properties on the order of one-step pressure-hydrate are obtained without the hazardous violence of one-step pressure-hydration. The novel, unexpected and useful results of the invention are obtained from a pressure-hydration of a mixture of from about 1% to 99% quicklime with the balance substantially entirely of atmospheric-hydrate.

It will be apparent that the present invention relates to dolomitic limes as distinguished from high calcium limes and that where in the specification and claims reference is had to limestone, quicklime, and hydrate, such will be understood to refer to dolomitic limestone, dolomitic quicklime and dolomitic hydrate.

Throughout the specification and claims, the atmospheric-hydration of quicklime will be understood to refer to the reaction of quicklime with sufficient water to convert substantially all of the calcium oxide to calcium hydroxide under reaction pressures of substantially atmospheric or insufficient to convert the major portion of magnesium oxide to magnesium hydroxide. Accordingly, an atmospheric-hydrate will be understood to refer to a dolomitic lime hydrate, the major portion of the calcium being hydrated and substantially none of the magnesium being hydrated.

Where referred to in the specification and claims, a superatmospheric or pressure-hydration of quicklime, atmospheric-hydrate or a mixture thereof, will be understood to refer to the reaction thereof with sufficient water and under sufficient pressure in excess of atmospheric pressure to convert substantially all of the calcium and magnesium oxides present to the hydroxides, or as referred to herein, the hydrates. A pressure-hydrate will be understood to refer to a hydrated dolomitic lime in which substantially all of both the calcium and magnesium components are hydrated to the hydroxide.

Having completed a detailed description of the preferred embodiments of my invention so that those skilled in the art may practice the same, I contemplate that other variations may be made without departing from the essence of the invention or the scope of the appended claims.

1. The improved method of making pressure hydrated lime comprising the steps of forming a mixture of essentially atmospheric-hydrated, and hydrating said mixture under superatmospheric pressure of at least 80 p.s.i. in the mitic quicklime and the other of which components is atmospheric-hydrate, the dolomitic quicklime consisting of from 5% to 95% of the mixture with the balance substantially atmospheric-hydrate, and hydrating said mixture under superatmospheric pressure of at least 80 p.s.i. in the presence of sufficient water to convert substantially all of the unhydrated calcium and magnesium compounds present to the respective hydroxides.

2. The improved method of making pressure-hydrated lime comprising the steps of forming a mixture of essentially two components, one of which components is dolomitic quicklime and the other of which components is atmospheric-hydrate, and hydrating said mixture under superatmospheric pressure of at least 80 p.s.i. in the presence of sufficient water to convert substantially all of the unhydrated calcium and magnesium compounds present to the respective hydroxides, the dolomitic quicklime being present in the amount of from 33% to 67% of the total mixture and the balance of said mixture being substantially entirely of atmospheric-hydrate, whereby a pressure-hydrate of a consistency substantially equal to the product of a one-step pressure hydration is produced without the violence and hazards of one-step hydration.

3. The improved method of making pressure-hydrated lime comprising the steps of forming a mixture of essentially two components, one of which components is dolomitic quicklime and the other of which components is atmospheric-hydrate, and hydrating said mixture under superatmospheric pressure of at least 80 p.s.i. in the presence of sufficient water to convert substantially all of the unhydrated calcium and magnesium compounds present to the respective hydroxides, the dolomitic quicklime and atmospheric-hydrate being present in the mixture in substantially equal portions, whereby a pressure-hydrate of a consistency substantially equal to the product of a one-step pressure hydration is produced without the violence and hazards of one-step hydration.

4. The improved method of pressure-hydrating dolomitic quicklime comprising the steps of hydrating a portion of said quicklime with water at atmospheric pressures, converting the CaO portion thereof to $Ca(OH)_2$ while not substantially affecting the MgO portion thereof, forming a mixture of essentially two components, one of which components is the reaction product of said atmospheric hydration and the other of which components is said quicklime and wherein said quicklime constitutes from 5% to 95% of the total mixture, and hydrating said mixture under superatmospheric pressure of at least 80 p.s.i., whereby an improved pressure-hydrate is produced under relatively non-hazardous conditions.

5. The improved method of making pressure hydrated lime comprising the steps of forming a mixture essentially of between about 33% and 67% dolomitic quicklime and between about 33% and 67% atmospheric hydrate, charging a pressure-resistant containing means with said mixture and sufficient water to hydrate substantially all of the unhydrated portions of said mixture, filling said containing means by said charging to such a sufficient degree that the exothermic reaction will produce a pressure within said containing means of at least 80 p.s.i., maintaining said containing means against escape of at least 80 p.s.i. of pressure built up during said hydration, whereby the exothermic nature of said hydration provides a relatively safe superatmospheric hydration producing a high consistency pressure-hydrate.

6. The improved method of making pressure hydrated lime comprising the steps of forming a mixture essentially of between about 33% and 67% dolomitic quicklime and between about 33% and 67% atmospheric hydrate, charging a pressure-resistant containing means with said mixture and sufficient water to hydrate substantially all of the unhydrated portions of said mixture, injecting steam of superatmospheric pressure into said containing means, maintaining said containing means against escape therefrom of at least 80 p.s.i. of pressure, whereby there is provided a relatively safe superatmospheric hydration producing a high consistency pressure-hydrate.

References Cited in the file of this patent

UNITED STATES PATENTS

| | | |
|---|---|---|
| 1,284,505 | Warner et al. | Nov. 12, 1918 |
| 2,309,168 | Corson | Jan. 26, 1943 |
| 2,356,760 | Garvin | Aug. 29, 1944 |
| 2,365,736 | Warner | Dec. 26, 1944 |
| 2,408,647 | Huntzicker et al. | Oct. 1, 1946 |

UNITED STATES PATENT OFFICE
CERTIFICATE OF CORRECTION

Patent No. 2,902,346                                            September 1, 1959

Joseph Volk

It is hereby certified that error appears in the printed specification of the above numbered patent requiring correction and that the said Letters Patent should read as corrected below.

Column 4, line 69, claim 1, after the syllable "tially" insert -- two components, one of which components is dolomitic --; lines 69, 70, and 71, strike out "atmospheric-hydrated, and hydrating said mixture under superatmospheric pressure of at least 80 p.s.i. in the mitic".

Signed and sealed this 26th day of January 1960.

(SEAL)
Attest:

KARL H. AXLINE                                          ROBERT C. WATSON

Attesting Officer                                        Commissioner of Patents